(12) United States Patent
Adam

(10) Patent No.: US 8,987,428 B2
(45) Date of Patent: Mar. 24, 2015

(54) LIGNIN-BASED SURFACTANTS

(75) Inventor: Georgius Abidal Adam, Edensor Park (AU)

(73) Assignee: Empire Technology Development LLC, Wilmington, DE (US)

( * ) Notice: Subject to any disclaimer, the term of this patent is extended or adjusted under 35 U.S.C. 154(b) by 40 days.

(21) Appl. No.: 13/698,776

(22) PCT Filed: Mar. 7, 2012

(86) PCT No.: PCT/US2012/028022
§ 371 (c)(1),
(2), (4) Date: Nov. 19, 2012

(87) PCT Pub. No.: WO2013/133820
PCT Pub. Date: Sep. 12, 2013

(65) Prior Publication Data
US 2013/0237695 A1    Sep. 12, 2013

(51) Int. Cl.
*C07G 1/00* (2011.01)
*C08H 7/00* (2011.01)
*C08L 97/00* (2006.01)

(52) U.S. Cl.
CPC ... *C08H 6/00* (2013.01); *C07G 1/00* (2013.01)
USPC ................... 530/501; 530/504; 530/505

(58) Field of Classification Search
CPC .................. C07G 1/00; C08H 6/00
USPC ......................... 530/501, 504, 505
See application file for complete search history.

(56) References Cited

U.S. PATENT DOCUMENTS

| | | | |
|---|---|---|---|
| 3,697,498 A | | 10/1972 | Browning et al. |
| 3,699,042 A | | 10/1972 | Browning et al. |
| 3,810,882 A | | 5/1974 | Browning et al. |
| 3,865,803 A * | | 2/1975 | Falkehag ............ 527/400 |
| 4,113,542 A * | | 9/1978 | Johansson ............ 156/335 |
| 4,113,675 A * | | 9/1978 | Clarke et al. ............ 524/799 |
| 4,131,564 A * | | 12/1978 | Dilling ............ 516/77 |
| 4,219,082 A * | | 8/1980 | Kalfoglou ............ 166/270.1 |
| 4,221,708 A * | | 9/1980 | Lin ............ 530/501 |
| 4,332,589 A * | | 6/1982 | Lin ............ 8/557 |
| 4,351,671 A * | | 9/1982 | Rosenberg et al. ............ 106/804 |
| 4,420,644 A | | 12/1983 | Huibers et al. |
| 4,444,562 A * | | 4/1984 | Lin ............ 8/528 |
| 4,455,257 A * | | 6/1984 | Hoftiezer et al. ............ 530/501 |
| 4,492,586 A * | | 1/1985 | Lin ............ 8/528 |
| 4,534,771 A * | | 8/1985 | Dilling ............ 8/524 |
| 4,623,682 A * | | 11/1986 | Nicholson et al. ............ 524/3 |
| 4,631,129 A * | | 12/1986 | Heikkila ............ 210/635 |
| 4,647,704 A | | 3/1987 | Engel et al. |
| RE32,408 E * | | 4/1987 | Janiga ............ 524/14 |
| 4,728,728 A * | | 3/1988 | Lin et al. ............ 530/501 |
| 4,739,040 A | | 4/1988 | Naae et al. |
| 4,739,041 A | | 4/1988 | Morrow et al. |
| 4,764,597 A * | | 8/1988 | Dilling ............ 530/501 |
| 4,769,434 A * | | 9/1988 | Van der Klashorst et al. ............ 527/403 |
| 4,781,251 A | | 11/1988 | Naae et al. |
| 4,787,454 A | | 11/1988 | Naae et al. |
| 4,822,501 A | | 4/1989 | Debons et al. |
| 4,836,285 A * | | 6/1989 | Navratil et al. ............ 166/295 |
| 4,892,588 A * | | 1/1990 | Dilling et al. ............ 106/501.1 |
| 4,990,191 A * | | 2/1991 | Schilling ............ 106/805 |
| 5,012,870 A * | | 5/1991 | Schilling ............ 166/293 |
| 5,013,825 A | | 5/1991 | Dilling |
| 5,026,808 A * | | 6/1991 | Schroeder ............ 527/400 |
| 5,035,288 A * | | 7/1991 | Kieke et al. ............ 166/270.1 |
| 5,075,402 A * | | 12/1991 | Schmitt et al. ............ 527/400 |
| 5,114,599 A | | 5/1992 | Debons et al. |
| 5,177,169 A * | | 1/1993 | Schroeder ............ 527/400 |
| 5,202,403 A * | | 4/1993 | Doering ............ 527/403 |
| 5,686,512 A | | 11/1997 | Liu |
| 5,866,642 A * | | 2/1999 | McVay et al. ............ 524/74 |
| 6,207,808 B1 * | | 3/2001 | Naae et al. ............ 530/502 |
| 6,284,838 B1 * | | 9/2001 | Silbiger ............ 525/54.4 |
| 6,632,912 B2 * | | 10/2003 | Sudan ............ 527/403 |
| 6,689,737 B2 * | | 2/2004 | Scheibel ............ 510/462 |
| 6,942,727 B2 | | 9/2005 | Daczko et al. |
| 8,268,121 B2 * | | 9/2012 | Blount ............ 162/72 |
| 2003/0045665 A1 * | | 3/2003 | Sudan ............ 527/300 |
| 2009/0197991 A1 | | 8/2009 | Bury et al. |
| 2010/0075878 A1 * | | 3/2010 | Gizaw et al. ............ 510/119 |
| 2011/0094678 A1 * | | 4/2011 | Blount ............ 156/336 |
| 2011/0245381 A1 * | | 10/2011 | Winterowd et al. ............ 524/14 |
| 2013/0180927 A1 * | | 7/2013 | Dong et al. ............ 210/731 |
| 2013/0233037 A1 * | | 9/2013 | Adam ............ 71/23 |
| 2013/0237694 A1 * | | 9/2013 | Adam ............ 530/501 |

FOREIGN PATENT DOCUMENTS

| DE | 3742963 A1 | 7/1988 |
|---|---|---|
| IQ | 2880 A | 2/2001 |

(Continued)

OTHER PUBLICATIONS

Machine translation of JP 07224135 A, 2014.*

(Continued)

*Primary Examiner* — Liam J Heincer
(74) *Attorney, Agent, or Firm* — Pepper Hamilton LLP

(57) ABSTRACT

Methods for converting waste streams from the wood pulping industry to high-value surfactants are described. For example, isolated lignin and lignosulfonate or waste streams containing lignin and lignosulfonate can be directly converted to surfactants, or they can be first converted to methylol derivatives and treated with further reagents to produce surfactants.

16 Claims, No Drawings

(56) References Cited

FOREIGN PATENT DOCUMENTS

| JP | 57175766 A | * | 10/1982 | |
| JP | 07224135 A | * | 8/1995 | ............ C08G 16/02 |
| WO | WO2010/106182 A1 | | 9/2010 | |

OTHER PUBLICATIONS

Niemela et al., Characterization of Pulping Liquors, Analytical methods in wood chemistry, pulping, and papermaking, Springer-Verlag, 1999.*

Translation of JP 57-175766, 2014.*

International Search Report and Written Opinion for PCT/US2012/028022 dated May 16, 2012.

Adam et al., Colorimetric investigation of curing of some new polyhydroxy epoxy resins, *Thermochimica Acta* (Feb. 15, 1987), 111:115-120 (Abstract).

Adam et al., Thermosetting characteristics of some new polymethylol epoxy resins, *Thermochimica Acta* (Jan. 1, 1987), 109(2):297-301 (Abstract).

Argyropoulos, Heteronuclear NMR Spectroscopy of Lignins, *Lignin and Lignans: Advances in Chemistry* (CRC Press, New York, 2010).

Busch et al., The utilization of renewable resources in German industrial production, *Biotechnol. J.* (2006), 1:770-776.

Chen et al., A Brief History of Lignin-Containing Polymeric Materials Culminating in X-ray Powder Diffraction Analyses of Kraft Lignin-Based Thermoplastic Polymer Blends, *ACS Symposium Series* (Apr. 16, 2007), 15(954):229-246 (Abstract).

DeBons et al., A Novel Lignin-Based Surfactant System for the Salem Unit, *SPE Annual Technical Conference and Exhibition*, (Oct. 6-9, 1991), Dallas, Texas.

Feldman, Wood-Chemistry, Ultrastructure, Reactions, *Journal of Polymer Science: Polymer Letters Edition* (Mar. 11, 2003), 23(11):601-602 (Abstract).

Gellerstedt et al., Towards a new concept of lignin condensation in kraft pulping: Initial results, *Comptes Rendus Biologies* (Sep.-Oct. 2004), 327(9-10):817-826 (Abstract).

Hu, Chemical Modification, Properties, and Usage of Lignin (Springer 2002) (Abstract).

Joniak et al., New Glycosides of Lignin, Institute of Chemistry, Slovak Academy of Sciences, Bratislava, Slovakia, (2000) http://www.lenzing.com/fileadmin/template/pdf/konzern/lenzinger_berichte/ausgabe_79_2000/LB_2000_Joniak_11_ev.pdf.

Joniak et al., Synthesis and Properties of Novel Lignin Surfactants, *Drevarsky Vyskum* (1999), 44(3-4):60-66.

Košíková et al., Conversion of Lignin biopolymer into surface-active derivatives, *European Polymer Journal* (2000), 36:1209-1212.

Malutan et al., Contribution to the Study of Hydroxymetylation Reaction of Alkali Lignin, *BioResources* (2008), 3(1):13-20.

Priefert et al., Biotechnological production of vanillin, *Applied Microbiology and Biotechnology* (2001), 56(3-4):296-314 (Abstract).

Sjostrom, Wood Chemistry, $2^{nd}$ Edition, Fundamentals and Applications (Jan. 6, 1993), p. 293 (Abstract).

Seeking Cheap, Green Surfactants, http://www.icis.com/articles/articles/aspx?liarticleID=9396996&printerfriendly=true (Sep. 28, 2010).

Turunen et al., Modification of phenol-formaldehyde resol resins by lignin, starch, and urea, *Journal of Applied Polymer Science* (Feb. 5, 2003), 88(2):582-588 (Abstract).

Wongsiriwan et al., Lignocellulosic Biomass Conversion by Sequential Combination of Organic Acid and Base Treatments, *Energy Fuels* (Apr. 26, 2010), 24(5):3232-3238 (Abstract).

Adam, Chemistry and Technology of Methylolic Resins: Their Derivatives and IPNs, *National Journal of Chemistry*, (2001), 1:131-157.

Adam et al., Thermosetting characteristics of some new polymethylolepoxy resins, *J. Thermochemica Acta ,TCA—109* (1987), 297-301.

Al-Ali, Synthesis, characterization and study of some new Resol-Novolac resins and their IPNs, M.Sc. Thesis, Basra University (1997).

Herrmann et al., The shikimate pathway, *Annual Review of Plant Physiology and Plant Molecular Biology* (Jun. 1999), 50:473-503.

Plank, Applications of biopolymers and other biotechnological products in building materials, *Applied Microbiology and Biotechnology* (2004), 66(1):1-9.

* cited by examiner

LIGNIN-BASED SURFACTANTS

CLAIM OF PRIORITY

This application is a national phase application under 35 U.S.C. §371 of International Application No. PCT/US2012/028022, filed Mar. 7, 2012 entitled "LIGNIN-BASED SURFACTANTS", the disclosure of which is incorporated herein by reference in its entirety.

BACKGROUND

Lignin, which represents 15-35% of wood, is the most abundant renewable organic material on the earth. The pulping industry separates cellulose from the wood composition resulting in lignin and hemicellulose waste by-products known as black liquor and spent pulp liquor. In the sulphite process, the main by-product contained in the spent pulp liquor is lignosulphonate. With each ton of pulping products producing 330-540 Kg of lignosulphonate, the global annual production capacity of lignosulphonate is about 1.8-2.0 million tons. Most of the lignosulphonate (66%) produced in pulping industries is burned as fuel and 34% is treated and disposed. Using this waste stream as a fuel source is inefficient, and releases large amounts of pollutants such as $SO_2$. Simple disposing of lignin, on the other hand, incurs a significant cost to the pulping industry.

Surfactants have myriad industrial and consumer uses. The world production of surfactants in 1990 was 40 million tons which increased to 60 million tons by 2010. Surfactants are used in soaps, detergents, dispersants for dyestuffs, admixtures for concrete as water reducers and plasticizers, emulsifiers for bitumen and agrochemicals such as pesticides and fungicides. They are also used in enhanced oil recovery and oil drilling, wetting agents for textiles and pharmaceuticals, foaming agents, and demulsifying agents. Lignin-based surfactants could replace the current industrial manufacture of surfactants, particularly those based on petrochemical resources, which use non-renewable resources, are expensive, and create non-biodegradable surfactants.

SUMMARY

This disclosure is not limited to the particular systems, devices and methods described, as these may vary. The terminology used in the description is for the purpose of describing the particular versions or embodiments only, and is not intended to limit the scope. While various compositions and methods are described in terms of "comprising" various components or steps (interpreted as meaning "including, but not limited to"), the compositions and methods can also "consist essentially of" or "consist of" the various components and steps, and such terminology should be interpreted as defining essentially closed-member groups.

Methods describe novel and simple processes comprising, among other things, the production of lignin-based surfactants. In some embodiments, methods of fabricating gemini surfactants from black liquor or spent liquor are described. The methods described herein may allow facile production of high-value products from waste stream from the pulping industry.

In an embodiment, a method of preparing a lignosulphonate methylol may comprise contacting lignosulphonate with an aldehyde compound to produce the lignosulphonate methylol. In such embodiments, the source of the lignosulphonate may be sulphonated black liquor or spent pulp liquor.

In an embodiment, a method of preparing a lignin methylol may comprise contacting lignin with an aldehyde compound at a pH of about 9 to about 10 to produce the lignin methylol. In such embodiments, the source of the lignin may be black liquor.

In an embodiment, a method of preparing lignin methylol or lignosulphonate methylol from solid lignin or solid lignosulphonate may comprise contacting lignin or lignosulphonate with an aldehyde compound to produce lignin methylol or lignosulphonate methylol. In such embodiments, the source of the lignosulphonate may be dried or dewatered black liquor or spent pulp liquor.

In an embodiment, a method of preparing a surfactant may comprise contacting lignin methylol or lignosulphonate methylol with a reagent to produce the surfactant. In some embodiments, the reagent may comprise a carboxylic acid compound and the surfactant may be a lignin carboxylate compound or a lignosulphonate carboxylate compound.

In an embodiment, a method of preparing a surfactant may comprise contacting lignin with a reagent to produce the surfactant. In some embodiments, the reagent may comprise a carboxylic acid compound and the surfactant may be a lignin carboxylate compound or a lignosulphonate carboxylate compound.

In an embodiment, a method of preparing lignocarboxylate or lignosulphonate carboxylate may comprise contacting lignin or lignosulphonate with carbon dioxide to produce lignocarboxylate or lignosulphonate carboxylate.

In an embodiment, a surfactant may comprise a ligno phosphate compound, a lignosulphonate phosphate compound, a ligno ethanolamine compound, a ligno sulphonate ethanolamine compound, a ligno polyhydroxycarboxylate compound, a ligno sulphonate polyhydroxycarboxylate compound, a lignopolycarboxylate compound, a lignosulphonate polycarboxylate compound, a lignopolyhydroxycarboxylate compound, or a lignosulphonate polyhydroxycarboxylate compound.

In some embodiments, a water-based resin may comprise a lignoepoxide compound or a lignosulphonate epoxide compound. In other embodiments, a polyurethane product may comprise a lignourethane compound or a lignosulphonate urethane compound. In further embodiments, a corrosion inhibitor, epoxy hardener, or a base for a hydrogel may comprise a lignoamine compound or a lignosulphonate amine compound.

In an embodiment, a method of preparing a surfactant may comprise contacting a lignin-based material with a carbohydrate or carbohydrate derivative in the presence of a catalyst to produce the surfactant. In some embodiments, the carbohydrate may be dextrose syrup, glucose syrup, or sucrose syrup. In other embodiments, the carbohydrate derivative may be a polyhydroxy carboxylic acid, a hydroxyl polycarboxylic acid, an aminocarboxylic acid, a lithium, sodium, potassium, ammonium or calcium salt thereof or other natural carboxylic acid or salt thereof derived by oxidation or fermentation of a carbohydrate.

In an embodiment, a method of preparing a surfactant may comprise contacting a lignin-based material with an amino acid in a solvent to produce the surfactant. In some embodiments, the amino acid is the sodium salt of arginine, leucine, lysine, glycine, glutamic acid, aspartic acid, contrition sulfate, or a combination thereof.

In an embodiment, a method of preparing a Gemini surfactant may comprise contacting a lignin-based material with an amino acid in a solvent to produce the Gemini surfactant, wherein the number of reacted methylol groups with the amino acid may be two or more. In some embodiments, the amino acid may be the sodium salt of arginine, leucine, lysine, glycine, glutamic acid, aspartic acid, contrition sulfate, or a combination thereof. In an embodiment, a method of preparing a Gemini surfactant may comprise contacting a lignin-based material with an ethylene diamine derivative reactant to produce the Gemini surfactant, wherein the number of reacted methylol groups with the ethylene diamine derivative may be two or more. In some embodiments, the ethylene diamine derivative reactant may be ethylene diamine, diethylenetriamine, triethylenetetramine, or tetraethylenepentamine or polyethylenediamine.

In an embodiment, a method of preparing a surfactant may comprise contacting a lignin-based material with polyethylene oxide terminated with epoxide groups in the presence of a catalyst to produce the surfactant, wherein the number of reacted methylol groups with the ethylene diamine derivative may be two or more. In some embodiments, the polyethylene oxide terminated with epoxide groups has a molecular weight of about Mn=200 to about 600.

In an embodiment, a method of preparing a surfactant may comprise contacting a lignin-based material with a silicon compound to produce the surfactant. In some embodiments, the silicon compound may be silicon oil terminated with active siloxane groups.

In an embodiment, a surfactant may comprise a lignoamino acid salt compound, a lignosulphonate amino acid salt compound, a lignosilicone compound, a lignosulphonate silicone compound, a ligno-functionalized polymer compound, a lignosulphonate-functionalized polymer compound, a lignosaccharide compound, a lignosulphonate saccharide compound, a lignoethylendiamine derivative compound, a lignosulphonate ethylendiamine derivative compound, a lignoethanolamine derivative compound, lignosulphonate ethanolamine derivative compounds, a lignoglycoside, a lignosulphonate glycoside, or a combination thereof.

DETAILED DESCRIPTION

Described herein are methods for producing lignin-based surfactants. In some embodiments, lignin-based starting material may be sourced from waste pulp streams including black liquor and spent pulp liquor. In some embodiments, lignin-based starting material may be converted to methylols.

In an embodiment, a method of preparing a lignosulphonate methylol may comprise contacting lignosulphonate with an aldehyde compound to produce the lignosulphonate methylol. The lignosulphonate may comprise spent pulp liquor, sulphonated black liquor, or a combination thereof. The solid content of the spent pulp liquor or sulphonated black liquor may be adjusted to about 30% to about 60% by weight, to about 35% to about 55% by weight, or to about 40% to about 50% by weight, or about 45% to about 50% by weight, prior to contacting the lignosulphonate with the aldehyde compound. Specific examples of solid content include about 30%, about 35%, about 40%, about 45%, about 50%, about 55%, about 60%, and ranges between any two of these values (for example, from about 30% to about 40%). The net active weight of lignin in the black liquor may be determined from the total organic content as measured by thermal analysis of a sample of the black liquor dried at about 100° C. for about 3 hours. The net active content ratio of the lignosulphonate to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values (for example, from about 10:1 to about 17.5:1). In some embodiments, the aldehyde compound may be formaldehyde, paraformaldehyde, or trioxane.

In some embodiments, the lignosulphonate may be contacted with the aldehyde compound at a pH of about 8 to about 12, at a pH of about 9 to about 11, or at a pH of about 9.5 to about 10.5. In some embodiments, the lignosulphonate may be contacted with the aldehyde compound at a pH of about 9 to about 10. Specific examples of pH include about 8, about 8.5, about 9, about 9.5, about 10, about 10.5, about 11, about 11.5, about 12, and ranges between any two of these values (for example, from about 9 to about 11). The lignosulphonate may be contacted with the aldehyde compound at a temperature of about 50° C. to about 85° C., about 55° C. to about 80° C., about 60° C. to about 75° C., or about 65° C. to about 70° C. In some embodiments, the lignosulphonate may be contacted with the aldehyde compound at a temperature of about 65° C. to about 70° C. Specific examples of temperatures include about 50° C., about 55° C., about 60° C., about 65° C., about 70° C., about 75° C., about 80° C., about 85° C., and ranges between any two of these values (for example, from about 65° C. to about 80° C.). The lignosulphonate may be contacted with the aldehyde compound for about 2 to about 5 hours, about 2.5 to about 4.5 hours, or about 3 to about 4 hours. In some embodiments, the lignosulphonate may be contacted with the aldehyde compound for about 3 to about 4 hours. In some embodiments, the lignosulphonate may be contacted with the aldehyde compound for about 3 hours. Specific examples of contact time include about 2 hours, about 2.5 hours, about 3 hours, about 3.5 hours, about 4 hours, about 4.5 hours, about hours, and ranges between any two of these values (for example, from about 3.5 hours to about 4.5 hours). In some embodiments, higher temperatures may be synchronised with lower reaction times. In some embodiments heating for more than about 3 hours may occur with reaction temperatures below about 60° C. At higher temperatures and longer reaction times, the methylol resins may condense and form a bulk of highly crosslinked thermoset resin.

In some embodiments, the lignosulphonate methylol may comprise lignosulphonate monomethylol, lignosulphonate dimethylol, lignosulphonate trimethylol, or lignosulphonate oligomethylol. In further embodiments, the lignosulphonate methylol may be cooled to about 0° C. to about 10° C., or to about 0° C. to about 5° C. In further embodiments, the lignosulphonate methylol may be cooled to about 0° C. to about 10° C. In some embodiments, the lignosulphonate methylol may be cooled to about 0° C. to about 5° C. Specific examples of cooled temperatures include about 0° C., about 5° C., about 10° C., and ranges between any two of these values (for example, from about 5° C. to about 10° C.).

The cooled lignosulphonate methylol may be neutralized with a pre-cooled acid, which may be at about 0° C. to about 10° C., and may be about 2% to about 15% or about 5% to about 10% acid, by weight. In some embodiments, the pre-cooled acid may be at about 0 to about 5° C. Specific cooled temperatures include about, about 0° C., about 5° C., about 10° C., and ranges between any two of these values (for example, from about 0° C. to about 5° C.). Specific concentration examples include about 2% by weight, about 5% by weight, about 7% by weight, about 10% by weight, and ranges between any two of these values (for example, from about 5% to about 10%). In some embodiments, the cooled lignosulphonate methylol may be neutralized to a pH of about 6.8 to about 7.2, to a pH of about 6.9 to about 7.1, or to a pH of about 7. In some embodiments, the cooled lignosulphonate methylol may be neutralized to a pH of about 7. In some embodiments, the pre-cooled acid may be phosphoric acid, paratoluenesulphonic acid, hydroxy acetic acid, gluconic acid, a hydroxypolycarboxylic acid, or a combination thereof.

In some embodiments, the neutralized, cooled, lignosulphonate methylol may be isolated, and the separated lignosulphonate methylol may be dissolved in at least one alcohol. In some embodiments, the alcohol may be selected from ethanol, methylated spirits, and isobutaol. In further embodiments, the lignosulphonate methylol may be dried. In some embodiments, the alcohol may be evaporated under reduced pressure to produce the lignosulphonate methylol as a solid residue, or semi-solid viscous product, or viscous product. In some embodiments, the lignosulphonate methylol may be dried with molecular sieves before evaporation of the solvent.

In another embodiment, a method of preparing a lignin methylol may comprise contacting lignin with an aldehyde compound at a pH of about 9 to about 10 to produce the liguin methylol. The lignin may comprise black liquor, and the solid content of the black liquor may be adjusted to about 40% to about 70% by weight, to about 45% to about 65% by weight, or to about 50% to about 60% by weight prior to contacting the lignin with the aldehyde compound. Specific examples of solid content include about 40%, about 45%, about 50%, about 55%, about 60%, about 65%, about 70%, and ranges between any two of these values (for example, from about 45% to about 60%). The net weight active content ratio of the lignin to the aldehyde compound may be about 1:1 to about 20:1. In some embodiments, the net active content ratio of the lignin to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values. In some embodiments, the aldehyde compound may be formaldehyde, paraformaldehyde, or trioxane.

In some embodiments, the lignin may be contacted with the aldehyde compound at a temperature of about 50° C. to about 85° C. about 55° C. to about 80° C., about 60° C. to about 75° C., or about 65° C. to about 70° C. In some embodiments, the lignin may be contacted with the aldehyde compound at a temperature of about 65° C. to about 70° C. Specific examples of temperatures include about 50° C., about 55° C., about 60° C., about 65° C., about 70° C., about 750°, about 80° C., about 85° C., and ranges between any two of these values (for example, from about 55° C. to about 70° C.). The lignin may be contacted with the aldehyde compound for about 2 to about 5 hours, about 2.5 to about 4.5 hours, or about 3 to about 4 hours. In some embodiments, the lignin may be contacted with the aldehyde compound for about 3 to about 4 hours. In some embodiments, the lignin may be contacted with the aldehyde compound for about 3 hours. Specific examples of contact time include about 2 hours, about 2.5 hours, about 3 hours, about 3.5 hours, about 4 hours, about 4.5 hours, about 5 hours, and ranges between any two of these values (for example, from about 3.5 hours to about 4.5 hours). In some embodiments, higher temperatures may be synchronised with lower reaction times. In some embodiments, heating for more than about 3 hours may occur with reaction temperatures below about 60° C. At higher temperatures and longer reaction times, the methylol resins may condense and form a bulk of highly crosslinked thermoset resin. In some embodiments, the lignin may be contacted with the aldehyde compound at a pH of about 10. Specific examples of pH include about 8, about 8.5, about 9, about 9.5, about 10, about 10.5, and ranges between any two of these values (for example, from about 9 to about 10).

In some embodiments, the lignin methylol may comprise lignin monomethylol, lignin dimethylol, lignin trimethylol, or lignin oligomethylol. In further embodiments, the lignin methylol may be cooled to about 0° C. to about 10° C., or to about 0° C. to about 5° C. In further embodiments, the lignin methylol may be cooled to about 0° C. to about 10° C. In some embodiments, the lignin methylol may be cooled to about 0° C. to about 50° C. Specific examples of cooled temperatures include about 0° C., about 5° C., about 10° C., about 15° C., and ranges between any two of these values (for example, from about 5° C. to about 10° C.). The cooled lignin methylol may be neutralized with a pre-cooled acid, which may be at about 0° C. to about 10° C., and may be about 2% to about 10% or about 5% to about 10% acid, by weight. In some embodiments, the pre-cooled acid may be at about 0 to about 50° C. Specific pre-cooled temperatures include about 0° C., about 0° C. about 5° C., about 10° C., and ranges between any two of these values (for example, from about 0° C. to about 5° C.). Specific concentration examples include about 2% by weight, about 5% by weight, about 7% by weight, about 10% by weight, and ranges between any two of these values (for example, from about 5% to about 7%). In some embodiments, the cooled lignin methylol may be neutralized to a pH of about 6.8 to about 7.2, to a pH of about 6.9 to about 7.1, or to a pH of about 7. In some embodiments, the cooled lignin methylol may be neutralized to a pH of about 7. In some embodiments, the pre-cooled acid may be phosphoric acid.

In some embodiments, the neutralized, cooled, lignin methylol may be isolated, and the separated lignin methylol may be dissolved in at least one alcohol. In some embodiments, the alcohol may be selected from ethanol, methylated spirits and isobutanol. In further embodiments, the lignin methylol may be dried. In some embodiments, the alcohol may be evaporated under reduced pressure to produce the lignin methylol as a solid residue, or semi-solid viscous product, or viscous product. In some embodiments, the lignosulphonate methylol may be dried with molecular sieves.

In an additional embodiment, a method of preparing lignin methylol or lignosulphonate methylol from solid lignin or solid lignosulphonate may comprise dissolving the lignin or lignosulphonate and contacting the dissolved lignin or lignosulphonate with an aldehyde compound to produce the lignin methylol or lignosulphonate methylol. The lignin or lignosulphonate may comprise spent pulp liquor, sulphonated black liquor, black liquor, or a combination thereof. In some embodiments, the lignin or lignosulphonate may be dissolved in a base solution. In these embodiments, the base solution may be about 10% to about 20% by weight, about 12.5% to about 15% by weight sodium hydroxide. The solid content of the spent pulp liquor or sulphonated black liquor may be adjusted to about 40% to about 70% by weight, to about 45% to about 65% by weight, or to about 50% to about 60% by weight prior to contacting the lignosulphonate with the aldehyde compound. Specific examples of solid content include about 40%, about 45%, about 50%, about 55%, about 60%, about 65%, about 70%, and ranges between any two of these values (for example, from about 55% to about 65%). In some embodiments, the net weight active content ratio of the lignin or lignosulphonate to the aldehyde compound may be about 1:1 to about 20:1. In some embodiments, the net active content ratio of the lignin or lignosulphonate to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values (for example, from about 2:1 to about 7.5:1). In some embodiments, the aldehyde compound may be formaldehyde.

In some embodiments, the lignin or lignosulphonate may be contacted with the aldehyde compound at a pH of about 9 to about 10. In some embodiments, the lignin or lignosulphonate may be contacted with the aldehyde compound at a pH of about 10. Specific examples of pH include about 8, about 8.5, about 9, about 9.5, about 10, about 10.5 and ranges between any two of these values (for example, from about 9 to about 10). The lignin or lignosulphonate may be contacted with the aldehyde compound at a temperature of about 50° C. to about 85° C., about 55° C. to about 80° C., about 60° C. to about 75° C., or about 65° C. to about 70° C. In some embodiments, the lignin or lignosulphonate may be contacted with the aldehyde compound at a temperature of about 65° C. to about 70° C. Specific examples of temperatures include about 50° C., about 55° C., about 60° C., about 65° C., about 70° C., about 75° C., about 80° C., about 85° C., and ranges between any two of these values (for example, from about 55° C. to about 80° C.). The lignin or lignosulphonate may be contacted with the aldehyde compound for about 2 to about 5 hours, about 2.5 to about 4.5 hours, or about 3 to about 4 hours. In some embodiments, the lignin or lignosulphonate may be contacted with the aldehyde compound for about 3 to about 4 hours. In some embodiments, the lignin or lignosulphonate may be contacted with the aldehyde compound for about 3 hours. Specific examples of contact time include about 2 hours, about 2.5 hours, about 3 hours, about 3.5 hours, about 4 hours, about 4.5 hours, about 5 hours, and ranges between any two of these values (for example, from about 3.5 hours to about 4.5 hours). In embodiments, higher temperatures may be synchronised with lower reaction times. In some embodiments, beating for more than about 3 hours may occur with reaction temperatures below about 60° C. At higher temperatures and longer reaction times, the methylol resins may condense and form a bulk of highly crosslinked thermoset resin.

In some embodiments, the lignosulphonate methylol may comprise lignosulphonate monomethylol, lignosulphonate dimethylol, lignosulphonate trimethylol, or lignosulphonate oligomethylol, and the lignin methylol may be lignin monomethylol, lignin dimethylol, lignin trimethylol, or lignin oligomethylol. In further embodiments, the lignin methylol or lignosulphonate methylol may be cooled to about 0° C. to about 10° C. In further embodiments, the lignin methylol or lignosulphonate methylol may be cooled to about 0° C. to about 10° C., or to about 0° C. to about 5° C. In some embodiments, the lignin methylol or lignosulphonate methylol may be cooled to about 0° C. to about 5° C. Specific examples of cooled temperatures include about 0° C., about 5° C. about 10° C., and ranges between any two of these values (for example, from about 5° C. to about 10° C.). The cooled lignin methylol or lignosulphonate methylol may be neutralized with a pre-cooled acid, which may be at about 0° C. to about 10° C. and may be about 2% to about 7.5% acid, by weight. In some embodiments, the pre-cooled acid may be at about 0 to about 5° C. Specific pre-cooled temperatures include about 0° C., about 5° C., about 10° C., and ranges between any two of these values (for example, from about 5° C. to about 10° C.). Specific concentration examples include about 2% by weight, about 5% by weight, about 7% by weight, about 10% by weight, and ranges between any two of these values (for example, from about 5% to about 10%). In some embodiments, the cooled lignin methylol or lignosulphonate methylol may be neutralized to a pH of about 6.8 to about 7.0, to a pH of about 6.9 to about 7.0, or to a pH of about 7. In some embodiments, the cooled lignin methylol or lignosulphonate methylol may be neutralized to a pH of about 7. In some embodiments, the pre-cooled acid may be phosphoric acid.

In some embodiments, the neutralized, cooled, lignin methylol or lignosulphonate methylol may be isolated, and the separated lignin methylol or lignosulphonate methylol may be dissolved in an alcohol. In some embodiments, the alcohol may be selected from ethanol, methylated spirits and isobutanol. In further embodiments, the lignin methylol or lignosulphonate methylol may be dried. In some embodiments, the alcohol may be evaporated under reduced pressure to produce the lignin methylol or lignosulphonate methylol as a solid residue, or semi-solid viscous product, or viscous product. In some embodiments, the lignin methylol or lignosulphonate methylol may be dried with molecular sieves before evaporating the solvent.

In an embodiment, a method of preparing a surfactant may comprise contacting a lignin methylol or lignosulphonate methylol with a reagent to produce the surfactant. In some embodiments, the reagent may comprise a hydroxycarboxylic acid compound, polyhydroxycarboxylic acid, a hydroxylamine compound, isocyanate terminated polymers, an amine compound, a phosphate compound, epichlorohydrine, or sodium bisulphite.

In some embodiments, the lignin methylol or lignosulphonate methylol may be contacted with the reagent at about 20° C. to about 60° C., at about 25° C. to about 45° C., or at about 30° C. to about 35° C. In some embodiments, the lignin methylol or lignosulphonate methylol may be contacted with the reagent at about 30° C. to about 35° C. In some embodiments, the lignin methylol or lignosulphonate methylol may be contacted with the reagent at about 30° C. Specific examples of temperatures include about 20° C., about 25° C., about 30° C., about 35° C., about 40° C., about 45° C., about 50° C., about 60° C., and ranges between any two of these values (for example, from about 25° C. to about 35° C.). In some embodiments, the lignin methylol or lignosulphonate methylol may be contacted with the reagent for about 1 hour to about 4 hours, about 1.5 hours to about 3 hours, or about 2 hours. In some embodiments, the lignin methylol or lignosulphonate methylol may be contacted with the reagent for about two hours at about 30° C. Specific examples of contact time include about 1 hour, about 1.5 hours, about 2 hours, about 2.5 hours, about 3 hours, about 4 hours, about 5 hours, and ranges between any two of these values (for example, from about 1.5 hours to about 2.5 hours). Contact time may be determined by routine tests to indicate reaction completion which may be dependent on the reaction temperature and the reagent.

In further embodiments, the lignin methylol or lignosulphonate methylol and the reagent may be refluxed for about 30 minutes to about 120 minutes, about 40 minutes to about 100 minutes, or about 60 minutes to about 80 minutes. In some embodiments, the lignin methylol or lignosulphonate methylol and the reagent may be refluxed for about 1 hour. Specific examples of reflux time include about 1 hour, about 1.5 hours, about 2 hours, about 2.5 hours, about 3 hours, about 4 hours, about 5 hours, and ranges between any two of these values (for example, from about 3 hours to about 5 hours). In some embodiments, the reaction products may be neutralized with a basic solution. In some embodiments, the basic solution may be sodium hydroxide or calcium hydroxide at about 2% to about 20% by weight, about 5% to about 20% by weight, or about 10% to about 20% by weight.

In some embodiments where the reagent comprises at least one carboxylic acid compound, the surfactant may be a lignin carboxylate compound or a lignosulphonate carboxylate compound. In some embodiments, the carboxylic acid compound may comprise a polycarboxylic acid, a hydroxycarboxylic acid, hydroxydicarboxylic acid, or polyhydroxycarboxylic acid. In other embodiments, the carboxylic acid compound may comprise gluconic acid, citric acid, tartaric acid, hydroxybutyric acid, hydroxyacetic acid, hydroxymalonic acid, hydroxysuccinic acid, or hydroxyglutamic acid. In some embodiments where the reagent comprises a hydroxyamino compound, the surfactant may comprise a lignoethanolamine compound or a lignosulphonate ethanolamine compound. In some embodiments, the hydroxylamine compound may comprise monoethanolamine, diethanolamine, triethanolamine, or hydroxyl amine.

In some embodiments where the reagent comprises an isocyante terminated polymer, the surfactant may comprise a lignourethane compound or a lignosulphonate urethane compound as foamed hydrogel water stop product. In some embodiments where the reagent comprises an amine compound, the surfactant may comprise a lignoamine compound or a lignosulphonate amine compound. In some embodiments where the reagent comprises a phosphate compound, the surfactant may comprise a lignophosphate compound or a lignosulphonate phosphate compound. In some embodiments where the reagent comprises epichlorohydrine, the surfactant may comprise a water based lignoepoxy compound or a lignosulphonate epoxy compound. In some embodiments where the reagent comprises sodium bisulphite, the surfactant may comprise a lignosulphonate compound.

In another embodiment, a method of preparing a surfactant may comprise contacting lignin with a reagent in a lignin/reagent reaction mixture to produce the surfactant. In some embodiments, the reagent may comprise a carboxylic acid compound, a hydroxyamino compound, an isocyante terminated polymer, an amine compound, a phosphate compound, epichlorohydrine, or sodium bisulphite. In some embodiments, the lignin may be in the form of black liquor. In these embodiments, the solid content of the black liquor may be adjusted to about 40% to about 70% by weight, to about 45% to about 65% by weight, or to about 50% to about 60% by weight prior to contacting the lignin with a reagent. Specific examples of solid content include about 40%, about 45%, about 50%, about 55%, about 60%, about 65%, about 70%, and ranges between any two of these values (for example, from about 55% to about 65%).

In some embodiments, the lignin may be contacted with the reagent at about 20° C. to about 60° C., at about 25° C. to about 45° C. or at about 30° C. to about 35° C. In some embodiments, the lignin may be contacted with the reagent at about 30° C. to about 35° C. In some embodiments, the lignin may be contacted with the reagent at about 30° C. Specific examples of temperatures include about 20° C., about 25° C., about 30° C., about 35° C., about 40° C., about 45° C., about 50° C. about 60° C., and ranges between any two of these values (for example, from about 25° C. to about 35° C.). In some embodiments, the lignin may be contacted with the reagent for about 1 hour to about 4 hours, about 1.5 hours to about 3 hours, or about 2 hours. In some embodiments, the lignin may be contacted with the reagent for about two hours at about 30° C. Specific examples of contact time include about 1 hour, about 1.5 hours, about 2 hours, about 2.5 hours, about 3 hours, about 4 hours, about 5 hours, and ranges between any two of these values (for example, from about 2.5 hours to about 4 hours).

In further embodiments, the lignin/reagent reaction mixture may be refluxed for about 30 minutes to about 120 minutes, about 40 minutes to about 100 minutes, or about 60 minutes to about 80 minutes. In some embodiments, the lignin/reagent reaction mixture may be refluxed for about 1 hour. Specific examples of reflux time include about 1 hour, about 1.5 hours, about 2 hours, and ranges between any two of these values (for example, from about 1.5 hours to about 2 hours). In some embodiments, the lignin/reagent reaction mixture may be neutralized with a basic solution. In some embodiments, the basic solution may be sodium hydroxide or calcium hydroxide at about 2% to about 20% by weight, about 5% to about 20% by weight, or about 10% to about 20% by weight.

In some embodiments where the reagent comprises at least one carboxylic acid compound, the surfactant may be a lignin carboxylate compound. In some embodiments, the carboxylic acid compound may comprise at least one polycarboxylic acid, a hydroxycarboxylic acid, hydroxydicarboxylic acid, polyhydroxycarboxylic acid, or combinations thereof. In other embodiments, the carboxylic acid compound may comprise gluconic acid, citric acid, tartaric acid, hydroxybutyric acid, hydroxyacetic acid, hydroxymalonic acid, hydroxysuccinic acid, hydroxyglutamic acid, or combinations thereof. In some embodiments where the reagent comprises a hydroxyamino compound, the surfactant may comprise a lignoethanolamine compound. In some embodiments, the hydroxylamino compound may comprise monoethanolamine, diethanolamine, triethanolamine, hydroxyl amine, or combinations thereof. In some embodiments where the reagent comprises an isocyante terminated polymer, the surfactant may comprise a lignourethane compound as a foamed hydrogel water stop product. In some embodiments where the reagent comprises an amine compound, the surfactant may comprise a lignoamine compound. In some embodiments where the reagent comprises a phosphate compound, the surfactant may comprise a lignophosphate compound. In some embodiments where the reagent comprises epichlorohydrine, the surfactant may comprise a water based lignoepoxy compound. In some embodiments where the reagent comprises sodium bisulphite, the surfactant may comprise a lignosulphonate compound with a high degree of sulphonation.

In another embodiment, a method of preparing lignocarboxylate or lignosulphonate carboxylate may comprise contacting lignin or lignosulphonate with carbon dioxide to produce lignocarboxylate or lignosulphonate carboxylate. In some embodiments, the carbon dioxide may be a gas or in the form of dry ice. In other embodiments, the carbon dioxide may be carbon dioxide adducts formed by carbon dioxide absorbers which are formed in the reclaiming processes of carbon dioxide from the atmosphere or from industrial sources. In some embodiments, the lignin may comprise black liquor and the lignosulphonate may be in the form of spent pulp liquor, sulphonated black liquor, or a combination thereof. In some embodiments, the solid content of the black liquor, spent pulp liquor or sulphonated black liquor may be adjusted to may be adjusted to about 40% to about 70% by weight, to about 45% to about 65% by weight, or to about 50% to about 60% by weight prior to contacting the lignin or lignosulphonate with carbon dioxide. Specific examples of solid content include about 40%, about 45%, about 50%, about 55%, about 60%, about 65%, about 70%, and ranges between any two of these values (for example, from about 55% to about 65%).

In some embodiments, the lignin or lignosulphonate may be contacted with the carbon dioxide under a pressure of about 90 atm to about 150 atm. about 100 atm to about 130 atm, or about 100 atm to about 120 atm. In some embodiments, the lignin or lignosulphonate may be contacted with the carbon dioxide under a pressure of about 100 atm. In some embodiments, the lignin or lignosulphonate may be contacted with the carbon dioxide at a temperature of about 100° C. to about 16° C., about 110° C. to about 140° C., or about 120° C. to about 130° C. In some embodiments, the lignin or lignosulphonate may be contacted with the carbon dioxide at a temperature of about 125° C. Specific examples of temperatures include about 100° C., about 115° C. about 120° C., about 125° C., about 130° C., about 14° C., about 15° C., about 160° C., and ranges between any two of these values (for example, from about 120° C. to about 14° C.). In some embodiments, the lignin or lignosulphonate may be contacted with the carbon dioxide for about 2 hours to about 8 hours, about 3 hours to about 7 hours, or about 4 hours to about 6 hours. In some embodiments, the lignin or lignosulphonate may be contacted with the carbon dioxide for about 5 hours. Specific examples of contact time include about 2 hours, about 3 hours, about 4 hours, about 4.5 hours, about 5 hours, about 5.5 hours, about 6 hours, about 7 hours, about 8 hours, and ranges between any two of these values (for example, from about 4.5 hours to about 5.5 hours). In some embodiments, the contacting may take place in an autoclave with a rotating mix.

In an embodiment, a method of preparing a surfactant may comprise contacting a lignin-based material with a carbohydrate or carbohydrate derivative in the presence of a catalyst to produce the surfactant. In some embodiments, the lignin-based material may be lignin methylol, lignosulphonate methylol, lignin, lignosulphonate, or any combination thereof. In some embodiments, the carbohydrate may be dextrose syrup, glucose syrup, or sucrose syrup. In these embodiments, the source of the carbohydrate may be include, but is not limited to, dates, sorbitol, maltose, or a combination thereof. In some embodiments, the carbohydrate derivative may be: a polyhydroxy carboxylic acid; a hydroxyl polycarboxylic acid, including but not limited to, hydroxymono carboxylic acids, hydroxydicarboxylic acids, hydroxytetracarboxylic acids, and hydroxypolycarboxylic acids; an aminocarboxylic acid, including but limited to, aminomono carboxylic acids, aminodi carboxylic acids, aminotri carboxylic acids, aminotetra carboxylic acids; a lithium, sodium potassium, ammonium or calcium salt thereof; or other natural carboxylic acid or salt thereof derived by oxidation or fermentation of a carbohydrate. Specific examples of carbohydrates and carbohydrate derivatives include sodium gluconate, sodium glutamate, hydroxyl sodium acetate, citric acid, tartaric acid, hydroxyl acetic acid, gluconic acid, and glutamic acid. The carbohydrates and carbohydrate derivatives may be obtained or derived from natural resources including, for example, dates, sugar cane waste, olive oil wastes, and others sugar and oil containing wastes.

In some embodiments, the ratio of lignin-based material to carbohydrate or carbohydrate derivative may be about 1:1 to about 1:1.2 based on moles of methylol groups in the lignin-based material to moles of the carbohydrate or carbohydrate derivative. In some embodiments, the ratio of lignin-based material to carbohydrate or carbohydrate derivative may be about 1:1. Specific examples of ratios include about 1:1.1, about 1:1.2, about 1:1.3 molar ratio and ranges between any two of these values (for example, from about 1:1 to about 1:1.1). In some embodiments, the catalyst may be phosphoric acid or paratoluene sulphonic acid.

In some embodiments, contacting the lignin-based material with the carbohydrate or carbohydrate derivative occurs with heating by a microwave or in a water bath. In some embodiments, the microwave may be a kitchen type microwave with an output of about 1100 watts to about 1500 watts. In some embodiments, the lignin-based material may be contacted with the carbohydrate or carbohydrate derivative at about 40° C. to about 60° C., at about 45° C. to about 55° C. In some embodiments, the lignin-based material may be contacted with the carbohydrate or carbohydrate derivative at about 50° C. Specific examples of temperatures include about 40° C., about 45° C., about 50° C., about 55° C., about 60° C., and ranges between any two of these values (for example, from about 40° C. to about 60° C.). In some embodiments, the lignin-based material may be contacted with the carbohydrate or carbohydrate derivative for about 0.5 hour to about 2 hours, about 1 hour to about 1.5 hours. In some embodiments, the lignin-based material may be contacted with the carbohydrate or carbohydrate derivative for about 0.5. Specific examples of contact time include about 0.5 hours, about 1 hours, about 1.0 hours, about 1.5 hours, about 4 hours, about 5 hours, and ranges between any two of these values (for example, from about 0.5 hours to about 2 hours).

In an embodiment, a method of preparing a surfactant may comprise contacting a lignin-based material with an amino acid in a solvent to produce the surfactant. In some embodiments, the lignin-based material may be lignin methylol, lignosulphonate methylol, lignin, or any combination thereof. In some embodiments, the amino acid may be the sodium salt of arginine, leucine, lysine, glycine, glutamic acid, aspartic acid, contrition sulfate, or a combination thereof. In some embodiments, the ratio of lignin-based material to amino acid may be about 1:1 to about 1:1.3 based on moles of methylol groups in the lignin-based material to moles of the amino acid. In some embodiments, the ratio of lignin-based material to amino acid may be about 1:1.1. Specific examples of ratios include about 1:1, about 1:1.2, about 1:1.3, and ranges between any two of these values (for example, from about 1:1 to about 1:1.2). In some embodiments, the solvent may be triethylamine or a mixture of triethylamine with n-butanol.

In some embodiments, contacting the lignin-based material with the amino acid occurs at about 50° C. to about 70° C. for about 3 hours to about 4.0 hours with efficient mixing. In some embodiments, contacting the lignin-based material with the amino acid occurs at about 60° C. for about 3 hours with efficient mixing. Specific examples of temperatures include about 50° C., about 55° C., about 60° C., about 65° C., about 70° C. and ranges between any two of these values (for example, from about 60° C. to about 65° C.). Specific examples of contact time include about 3 hours, about 3.2 hours, about 3.4 hours, about 3.5 hours, about 4 hours and ranges between any two of these values (for example, from about 3.0 hours to about 4.0 hours).

Gemini surfactants represent a class of surfactants made up of two identical or different amphiphilic moieties having the structure of conventional surfactants connected by a spacer group. The spacer may be hydrophobic (aliphatic or aromatic) or hydrophilic (polyether), short (two methylene groups) or long (up to 20 and more methylene groups), rigid (stilbene) or flexible (polymethylene chain). In an embodiment, a method of preparing a Gemini surfactant may comprise contacting a lignin-based material with an amino acid in a solvent to produce the Gemini surfactant, wherein the number of reacted methylol groups in lignin molecule with the amino acid may be two or more In some embodiments, the lignin-based material may be lignin methylol, lignosulphonate methylol, or any combination thereof. In some embodiments, the amino acid may be the sodium salt of: arginine, leucine, lysine, glycine, glutamic acid, aspartic acid, contrition sulfate, or a combination thereof. In some embodiments, the ratio of lignin-based material to amino acid may be from about 1:1 to about 1:1.3 based on moles of methylol groups in the lignin-based material to the amino acid. In some embodiments, the ratio of lignin-based material to amino acid may be about 1:1. Specific examples of ratios include about 1:1, about 1:1.1, about 1:1.2, about 1:1.3, and ranges between any two of these values (for example, from about 1:1 to about 1:1.2). In some embodiments, the solvent may be triethylamine or a mixture of triethylamine with n-butanol.

In some embodiments, contacting a lignin-based material with an amino acid occurs at about 50° C. to about 70° C. for about 3 hours to about 4.0 hours. In some embodiments, contacting a lignin-based material with an amino acid occurs at about 60° C. for about 3 hours. Specific examples of temperatures include about 50° C., about 55° C., about 60° C., about 65° C., about 70° C. and ranges between any two of these values (for example, from about 60° C. to about 65° C.). Specific examples of contact time include about 3 hours, about 3.2 hours, about 3.4 hours, about 3.5 hours, about 4 hours, and ranges between any two of these values (for example, from about 3.0 hours to about 4.0 hours).

In an embodiment, a method of preparing a Gemini surfactant may comprise contacting a lignin-based material with an ethylene diamine derivative reactant to produce the Gemini surfactant, wherein the number of reacted methylol groups in a lignin molecule with the ethylene diamine derivative may be two or more. In some embodiments, the lignin-based material may be lignin methylol, lignosulphonate methylol, or any combination thereof. In some embodiments, the ethylene diamine derivative reactant may be ethylene diamine, diethylenetriamine, triethylenetetramine, or tetraethylenepentamine or polyethylenediamine. In some embodiments, the ratio of lignin-based material to ethylene diamine reactant may be about 1:1 to about 1:1.3 based on moles of methylol groups in the lignin-based material to moles of the ethylene diamine derivatives. In some embodiments, the ratio of lignin-based material to ethylene diamine derivative reactant may be about 1:1. Specific examples of ratios include about 1:1, about 1:1.1, about 1:1.2, about 1:1.2, and ranges between any two of these values (for example, from about 1:1 to about 1:1.2).

In some embodiments, contacting the lignin-based material with the ethylene diamine derivative occurs at about 50° C. to about 70° C. for about 3 hours to about 4.0 hours. In some embodiments, contacting the lignin-based material with the ethylene diamine derivative occurs at about 60° C. to about 70° C. for about 3 hours. Specific examples of temperatures include about 50° C., about 60° C., about 65° C., about 70° C., and ranges between any two of these values (for example, from about 60° C. to about 65° C.). Specific examples of contact time include about 3 hours, about 3.2 hours, about 3.4 hours, about 3.5 hours, about 4 hours and ranges between any two of these values (for example, from about 3.0 hours to about 4.0 hours).

In an embodiment, a method of preparing a surfactant may comprise contacting a lignin-based material with polyethylene oxide terminated with epoxide groups in the presence of a catalyst to produce the surfactant, wherein the number of reacted methylol groups with the ethylene diamine derivative may be two or more. In some embodiments, the lignin-based material may be lignin methylol, lignosulphonate methylol, or any combination thereof. In some embodiments, the polyethylene oxide terminated with epoxide groups has a molecular weight (Mn) of about 200 to about 600. In some embodiments, the ratio of lignin-based material to polyethylene oxide may be about 1:1 to about 1:1.3 based on moles of methylol groups in the lignin-based material to moles of the polyethylene oxide. In some embodiments, the ratio of lignin-based material to polyethylene oxide may be about 1:1. Specific examples of ratios include about 1:1, about 1:1.1, about 1:1.2, about 1:1.2, and ranges between any two of these values (for example, from about 1:1 to about 1:1.2). In some embodiments the catalyst may be phosphoric acid, p-toluene sulphonic acid, or diamino compounds such as ethylene diamine and its derivatives.

In some embodiments, contacting the lignin-based material with the polyethylene oxide occurs at about 50° C. to about 70° C. for about 3 to about 4 hours. Specific examples of temperatures include about 50° C., about 55° C., about 60° C., about 65° C. about 70° C. and ranges between any two of these values (for example, from about 55° C. to about 65° C.). Specific examples of contact time include about 3 hours, about 3.2 hours, about 3.4 hours, about 3.5 hours, and ranges between any two of these values (for example, from about 3.0 hours to about 4.0 hours).

In an embodiment, a method of preparing a surfactant may comprise contacting a lignin-based material with a silicon compound to produce the surfactant. In some embodiments, the lignin-based material may be lignin methylol, lignosulphonate methylol, or any combination thereof. In some embodiments, the silicon compound may be silicon oil terminated with active siloxane groups. Specific examples of active siloxanes may be, but are not limited to, epoxide siloxanes and aziridine siloxanes. In some embodiments, the ratio of lignin-based material to silicon compound may be about 1:1 about 1:1.3 based on moles of methylol groups in the lignin-based material to moles of siloxanating agents. In some embodiments, the ratio of lignin-based material to silicon compound may be about 1:1. Specific examples of ratios include about 1:1, about 1:1.2, about 1:1.3, and ranges between any two of these values (for example, from about 1:1 to about 1:1.2).

In some embodiments, contacting the lignin-based material with the silicon compound occurs at about room temperature for about 6 hours to about 12 hours. Specific examples of temperatures include about 20° C., about 23° C., about 25° C., about 30° C., and ranges between any two of these values (for example, from about 23° C. to about 25° C.). Specific examples of contact time include about 6 hours, about 8 hours, about 10 hours, about 12 hours, and ranges between any two of these values (for example, from about 8 hours to about 10 hours).

In an embodiment, a surfactant may comprise a lignoamino acid salt compound, a lignosulphonate amino acid salt compound, a lignosilicone compound, a lignosulphonate silicone compound, a ligno-functionalized polymer compound, a lignosulphonate-functionalized polymer compound, a lignosaccharide compound, a lignosulphonate saccharide compound, a lignoethylendiamine derivative compound, a lignosulphonate ethylendiamine derivative compound, a lignoethanolamine derivative compound, lignosulphonate ethanolamine derivative compounds, a lignoglycoside, a lignosulphonate glycoside, or a combination thereof.

EXAMPLES

Example 1

Conversion of Black Liquor-Sourced Lignin to Methylol Lignin

Black liquor (1 L) with 50% to 60% solid content and a pH range of 9 to 13 was treated with varying amounts (100, 200, 400, 600, and 800 mL) of a formaldehyde solution (36% to 38% formaldehyde content [wt./vol]) to achieve lignin:formaldehyde net ratios of 20:1, 10:1, 5:1, 3.6:1, and 2.5:1. Each reaction was carried out in a five necked flanged top reaction vessel fitted with efficient mechanical stirrer immersed in thermo stated water bath. The effects of reaction pH, temperature, time, and reactant ratio on the concentration of methylols formed were investigated. The concentration of methylol lignin was determined in the reaction mixture by colorimetric techniques using ceric ammonium nitrate and differential scanning calorimetry. Among the tested parameters, a reaction time of 3 hours with a pH of 10, a temperature of 65-70° C., and a lignin:formaldehyde net active content ratio of 5:1 gave the highest concentration of ligno methylol derivatives. The obtained lignin methylol derivatives could be used in situ or separated from the solution and stabilized.

TABLE 1-1

Effect of weight ratio of lignin:aldehyde on the number of methylol groups per structural unit of lignin as determined by colorimetric and DSC.

| Exp. | Wt. ratio Lignin:aldehyde | Temperature °C. | Reaction time (h) | pH | Increase $CH_2OH$/ Structural unit of lignin. | Average of 3 exp | Increase Number of $CH_2OH$ |
|---|---|---|---|---|---|---|---|
| C-1 to C-3 | 20:1 | 65-70 | 3.0 | 9-10 | 0.25-0.75 | 0.56 | 1.0 |
| C-4 to C-6 | 10:1 | 65-70 | 3.0 | 9-10 | 1.54-1.87 | 1.75 | 2.0 |
| C-7 to C-9 | 5:1 | 65-70 | 3.0 | 9-10 | 2.59-3.4 | 2.83 | 3.0 |
| C-10 to C-12 | 3.6:1* | 65-70 | 3.0 | 9-10 | 2.84-3.3 | 2.86 | 3.0 |
| C-13 to C-15 | 2.5:1* | 65-70 | 3.0 | 9-10 | 2.94-3.4 | 2.98 | 3.0 |

*Excess of unreacted formaldehyde was found in the reaction mixture

TABLE 1-2

Effect of reaction temperature on the number of methylol groups per structural unit of lignin at weight ratio of lignin:aldehyde = 5:1.

| Exp. | Temp °C. | Reaction time (h) | pH | Increase $CH_2OH$/ Structural unit of lignin. | Average of 3 exp | Increase Number of $CH_2OH$ |
|---|---|---|---|---|---|---|
| T-1 to T-3 | 50-60 | 3.0 | 9-10 | 0.32-0.67 | 0.51 | 1.0 |
| T-4 to T-6 | 60-65 | 3.0 | 9-10 | 2.33-2.57 | 2.48 | 3.0 |
| T-7 to T-9 | 65-70 | 3.0 | 9-10 | 2.89-3.4 | 2.93 | 3.0 |
| T-10 to T-12 | 70-75 | 3.0 | 9-10 | 2.44-2.94 | 2.54 | 3.0 |
| T-13 to T-15 | 75-80* | 3.0 | 9-10 | 1.74-2.14 | 1.87 | 2.0 |

*Temperatures above 80° C. gave crosslinked products even for lower reaction time.

TABLE 1-3

Effect of pH on the methylol groups per structural unit of lignin at weight ratio of lignin:aldehyde = 5:1 and reaction temperature = 65-70° C.

| Exp. | Reaction time (h) | pH | Increase $CH_2OH$/Structural unit of lignin. | Average of 3 exp | Increase number of $CH_2OH$ |
|---|---|---|---|---|---|
| Al-1 to Al-3 | 3.0 | 8-9 | 0.22-0.48 | 0.45 | — |
| Al-4 to Al-6 | 3.0 | 9-10 | 2.89-3.4 | 2.93 | 3.0 |
| Al-7 to Al-9 | 3.0 | 10-11 | 2.78-3.32 | 2.90 | 3.0 |
| Al-10 to Al-12 | 3.0 | 11-12 | 2.01-2.64 | 2.54 | 3.0 |
| Al-13 to Al-15* | 3.0 | 12-13 | 1.64-1.98 | 1.87 | 2.0 |

*pH 13 and above gave gel crosslinked products even for lower reaction time.

TABLE 1-4

Effect of reaction time on the number of methylol groups per structural unit of lignin at weight ratio of lignin:aldehyde = 5:1, pH = 9-10, and reaction temperature = 65-70° C.

| Exp. | Reaction time (h) | Increase $CH_2OH$/ Structural unit of lignin. | Average of 3 exp | Increase number of $CH_2OH$ |
|---|---|---|---|---|
| t-1 to t-3 | 2.5 | 1.80-2.48 | 2.03 | 2 |
| t-4 to t-6 | 3.0 | 2.89-3.4 | 2.93 | 3.0 |
| t-7 to t-9 | 3.5 | 2.92-3.12 | 2.97 | 3.0 |
| t-10 to t-12 | 4.0 | 2.85-3.10 | 2.90 | 3.0 |
| t-13 to t 15 | 5.0 | 2.65-2.86 | 2.79 | 3.0 |

*Reaction time above 5 hours gave crosslinked gel products.

Example 2

Purification and Stabilization of Lignin Methylol

The lignin methylol reaction products from Example 1 in each case were cooled to 0-5° C. and neutralized to pH 7 by adding a pre-cooled 10% phosphoric acid (at 5° C.). The viscous semi-solid lignin methylol products were separated from the aqueous solution, dissolved in ethanol, dried with molecular sieves, and either used directly after evaporating ethanol under reduced pressure or stabilized by alcohols for storage in a refrigerator for future use.

Example 3

Preparation and Separation of Methylol Lignin from Solid Lignin Waste

Solid lignin (500 grams) from pulping waste was dissolved in 10-20% sodium hydroxide solution, the pH was adjusted to 9-10, with 50% to 60% solid content, and the solution was treated with formaldehyde at lignnin:formaldehyde net ratios of 20:1, 10:1, 5:1, 3.6:1, and 2.5:1. A reaction time of 3 hours with a pH of 10, a temperature of 60-75° C. and a lignin:formaldehyde net active content ratio of 5:1 gave 2.8 methylol groups per lignin structural unit. (Typical values are shown in Tables 1-1 to 1-4).

Example 4

Preparation of Methylol Lignosulphonate Derivatives

Lignosulphonate pulping by product was adjusted to a pH of 10 with 50% to 60% solid content and was treated with varying amounts of a formaldehyde solution to achieve lignin:formaldehyde net ratios of 20:1, 10:1, 5:1, 3.6:1, and 2.5:1.

Example 5

Preparation of Sodium Lignocarboxylate

One mole of a methylol lignin solution as prepared in Examples 1 or 2 was treated with citric acid at 30° C. using equivalent moles to methylol groups with mixing for two hours. The reaction mixture was then refluxed for one hour, cooled, and neutralized with a 20% sodium hydroxide solution to obtain sodium lignocarboxylate.

Example 6

Preparation of Sodium Lignocarboxylatesulphonate

One mole of methylol ligno sulphonate as prepared in Example 4 was treated with citric acid at 30° C. using equivalent moles to methylol groups with mixing for two hours. The reaction mixture was then refluxed for one hour, cooled, and neutralised with 20% sodium hydroxide solution to obtain sodium lignocarboxylatesulphonate dual functionality surfactant.

Example 7

Preparation of Sodium Lignogluconate

One mole of a methylol lignin solution as prepared in Examples 1, or 2 was treated with sodium gluconate or gluconic acid at 30° C. using equivalent moles to methylol groups. When sodium gluconate was used as reactant, 10% gluconic acid as catalyst and co reactant was added to the reaction mixture. The reaction mixture was mixed for two hours, and was then refluxed for one hour, cooled, and neutralized with 20% sodium hydroxide solution to obtain sodium lignogluconate surfactant.

Example 8

Preparation of Sodium Lignosulphonate Gluconate

One mole of a methylol lignosulphonate solution as prepared in Example 4 was treated with sodium gluconate or gluconic acid at 30° C. using equivalent moles to methylol groups. When sodium gluconate was used as reactant, 10% glucouic acid as catalyst and co reactant was added to the reaction mixture. The reaction mixture was mixed for two hours, and was then refluxed for one hour, cooled, and neutralized with 20% sodium hydroxide solution to obtain sodium lignosulphonate gluconate as surfactant.

Example 9

Preparation of Lignocarboxylate from Black Liquor and Carbon Dioxide

An autoclave reactor was charged with black liquor and solid carbon dioxide (dry ice), and was then secured and heated to 125° C. at 100 atm pressure with mixing for five hours. The reaction mixture was cooled and then the degree of carboxylation was determined by FTIR spectroscopy carried out on a purified sample. The quantitative analyses were based on the peak height at 1750 $cm^{-1}$ related to carboxyl group. The product underwent carboxylation as demonstrated by a 2-5% increase in the solid content after the carboxylation reactions which was in a good agreement with the FTIR results.

Example 10

Reaction of Lignomethylol with Carbohydrates

Equimolar amounts of semi-viscous lignomethylol from Example 1 and each of the following carbohydrate sources (dextrose syrup, glucose syrup and sucrose syrup from dates, sorbitol and maltose) were mixed together in the presence of phosphoric acid as catalyst and heated in a 1500 W microwave oven for 30 minutes. A homogenous viscous product was obtained, which was partially soluble in water according to the source of lignomethylols and the number of methylol groups per lignin molecule. The soluble part was separated and its surfactant properties were determined including: dynamic and static surface tension, viscosity and cloud point. High molecular weight methylol lignin gave almost insoluble products (95%) and had excellent emulsifying and wetting properties.

Example 11

Reaction of Lignomethylol and Lignosulphonate Methylol with Amino Acids

Equimolar amounts of lignomethylol and lignosulphonate methylol derivatives from Example 1 were reacted with sodium salts of arginine, leucine, lysine, glycine, glutamic acid, aspartic acid and contrition sulphate using equivalent moles of amino acid sodium salt to methylol groups in the presence of triethylamine as solvent. The reaction mixture was heated on a water bath at 60° C. for three hours. The lignoaminoacid salt surfactants obtained were separated, purified, and the general efficiency of the surfactants were determined including: surface tension measurement of water containing different concentrations of each surfactant, viscosity and cloud point.

Example 12

Preparation of Gemini Surfactants from Lignin-Based Materials and Amino Acids In the presence of triethylamine as solvent, lignomethylol and lignosulphonate methylol derivatives with two or more methylol groups per molecule from Example 1 were reacted with sodium salts of arginine, leucine, lysine, glycine, glutamic acid, aspartic acid and contrition sulphate in equimolar amounts based on moles of amino acid sodium salt to moles of methylol groups. The Gemini surfactants obtained were separated, purified, and the general efficiency of the surfactants were determined including: surface tension measurement of water containing different concentrations of each surfactant, viscosity and cloud point. The surfactant efficiency of these surfactants was superior to that of those from Example 11.

Example 13

Preparation of Gemini Surfactants from Lignin-Based Materials and Ethylene Diamines Lignomethylol and lignosulphonate methylol derivatives with two or more methylol groups per molecule from Example 1 were reacted with a series of ethylene diamines (ethylene diamine, diethylenetriamine, triethylenetetramine and tetraethylenepentamine) by mixing equimolar amounts of each component based on moles of amino acid sodium salt to moles of methylol groups and heating the mixture at 60-70 C for three hours. The Gemini surfactants obtained were separated, purified, and the general efficiency of the surfactants were determined including: surface tension measurement of water containing different concentrations of each surfactant, viscosity and cloud point.

Example 14

Reaction of Lignomethylol with Epoxide-Terminated Polyethylene Oxide

Lignomethylols from Example 1 and polyethylene oxide terminated with epoxide groups (Mn=200-600) were combined using equivalent molar ratios based on moles of polyethylene oxide to moles of methylol groups in the presence of phosphoric acid as catalyst and heated to 50-60° C. with continuous mixing for three hours. The surfactants obtained were separated, purified, and the general efficiency of the surfactants were determined including: surface tension measurement of water containing different concentrations of each surfactant, viscosity and cloud point.

Example 15

Reaction of Lignomethylol with Silicon Oil

Lignomethylols from Example 1 and silicon oil terminated with active siloxane groups were combined using equivalent molar ratios based on moles of siloxane to moles of methylol groups with continuous mixing at room temperature under dry conditions overnight. The surfactants obtained were separated, purified, and the general efficiency of the surfactants were determined including: surface tension measurement of water containing different concentrations of each surfactant, viscosity and cloud point.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g. the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or figure, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A method of preparing a surfactant, the method comprising:

providing a lignin-based material containing one or more methylol groups; and adding a carbohydrate or carbohydrate derivative to the lignin-based material, in a ratio of lignin-based material to carbohydrate or carbohydrate derivative of about 1:1 to about 1:1.3 based on moles of methylol groups in the lignin-based material to moles of the carbohydrate or carbohydrate derivative, in the presence of a catalyst to produce the surfactant.

2. The method of claim 1, wherein adding the carbohydrate or carbohydrate derivative to the lignin-based material comprises adding the carbohydrate or carbohydrate derivative to a lignin methylol, lignosulphonate methylol, or a combination thereof.

3. The method of claim 1, wherein adding the carbohydrate or carbohydrate derivative to the lignin-based material comprises adding a dextrose syrup, glucose syrup, or sucrose syrup to the lignin-based material.

4. The method of claim 1, wherein adding the carbohydrate or carbohydrate derivative to the lignin-based material comprises adding a polyhydroxy carboxylic acid, a hydroxyl polycarboxylic acid, an aminocarboxylic acid, a lithium, sodium, potassium, ammonium or calcium salt thereof, or other natural carboxylic acid or salt thereof derived by oxidation or fermentation of a carbohydrate to the lignin-based material.

5. The method of claim 1, wherein adding the carbohydrate or carbohydrate derivative to the lignin-based material comprises adding the carbohydrate or carbohydrate derivative to the lignin-based material in a ratio of lignin-based material to carbohydrate or carbohydrate derivative of about 1:1 based on moles of methylol groups in the lignin-based material to moles of the carbohydrate or carbohydrate derivative.

6. The method of claim 1, wherein adding the carbohydrate or carbohydrate derivative to the lignin-based material comprises adding the carbohydrate or carbohydrate derivative to the lignin-based material in a ratio of lignin-based material to carbohydrate or carbohydrate derivative of about 1:1.1 based on moles of methylol groups in the lignin-based material to moles of the carbohydrate or carbohydrate derivative.

7. The method of claim 1, wherein adding the carbohydrate or carbohydrate derivative to the lignin-based material comprises adding the carbohydrate or carbohydrate derivative to the lignin-based material in a ratio of lignin-based material to carbohydrate or carbohydrate derivative of about 1:1.3 based on moles of methylol groups in the lignin-based material to moles of the carbohydrate or carbohydrate derivative.

8. The method of claim 1, wherein adding the carbohydrate or carbohydrate derivative to the lignin-based material comprises adding the carbohydrate or carbohydrate derivative to the lignin-based material in the presence of phosphoric acid or paratoluene sulphonic acid.

9. The method of claim 1, wherein adding the carbohydrate or carbohydrate derivative to the lignin-based material occurs with heating by a microwave or in a water bath with mixing.

10. The method of claim 1, wherein adding the carbohydrate or carbohydrate derivative to the lignin-based material occurs at about 40° C. to about 60° C. for about 0.5 hours to about 5 hours.

11. The method of claim 1, wherein adding the carbohydrate or carbohydrate derivative to the lignin-based material occurs at about 45° C. to about 55° C. for about 2 hours.

12. The method of claim 1, wherein adding the carbohydrate or carbohydrate derivative to the lignin-based material comprises adding a polyhydroxy carboxylic acid or a hydroxyl polycarboxylic acid to the lignin-based material.

13. The method of claim 1, wherein adding the carbohydrate or carbohydrate derivative to the lignin-based material comprises adding a hydroxymono carboxylic acid, hydroxydicarboxylic acid, hydroxytetracarboxylic acid, or hydroxypolycarboxylic acid, or lithium, sodium, potassium, ammonium or calcium salt thereof to the lignin-based material.

14. The method of claim 1, wherein adding the carbohydrate or carbohydrate derivative to the lignin-based material comprises adding an aminomonocarboxylic acid, aminodicarboxylic acid, aminotricarboxylic acid, or aminotetracarboxylic acid, or a lithium, sodium, potassium, ammonium or calcium salt thereof to the lignin-based material.

15. The method of claim 1, wherein carbohydrate derivative to the lignin-based material comprises adding a natural carboxylic acid or salt thereof derived by oxidation or fermentation of a carbohydrate to the lignin-based material.

16. The method of claim 1, wherein adding the carbohydrate or carbohydrate derivative to the lignin-based material comprises adding sodium gluconate, sodium glutamate, hydroxyl sodium acetate, citric acid, tartaric acid, hydroxyl acetic acid, gluconic acid, or glutamic acid to the lignin-based material.

* * * * *

UNITED STATES PATENT AND TRADEMARK OFFICE
CERTIFICATE OF CORRECTION

PATENT NO. : 8,987,428 B2
APPLICATION NO. : 13/698776
DATED : March 24, 2015
INVENTOR(S) : Adam Page 1 of 1

It is certified that error appears in the above-identified patent and that said Letters Patent is hereby corrected as shown below:

In the Specification,

In Column 7, Line 37, delete "beating" and insert -- heating --, therefor.

In Column 10, Line 67, delete "150 atm." and insert -- 150 atm, --, therefor.

In Column 11, Line 43, delete "sodium" and insert -- sodium, --, therefor.

In Column 16, Line 52, delete "lignnin:" and insert -- lignin: --, therefor.

In Column 19, Line 64, delete "(e.g." and insert -- (e.g., --, therefor.

In Column 20, Line 24, delete "A. B," and insert -- A, B, --, therefor.

In Column 20, Line 27, delete "A. B," and insert -- A, B, --, therefor.

Signed and Sealed this
Eleventh Day of August, 2015

Michelle K. Lee
*Director of the United States Patent and Trademark Office*